United States Patent
Wichowski et al.

(10) Patent No.: US 9,601,003 B2
(45) Date of Patent: Mar. 21, 2017

(54) SENSOR AND CONTROL SYSTEMS FOR ELECTRICAL MACHINES

(71) Applicant: Hamilton Sundstrand Space Systems International, Inc., Windsor Locks, CT (US)

(72) Inventors: Robert P. Wichowski, Westfield, MA (US); Patrick J. Sears, South Hadley, MA (US); Kevin G. Hawes, Windsor Locks, CT (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 8 days.

(21) Appl. No.: 14/827,808

(22) Filed: Aug. 17, 2015

(65) Prior Publication Data

US 2017/0053526 A1    Feb. 23, 2017

(51) Int. Cl.
*G08B 29/18*    (2006.01)

(52) U.S. Cl.
CPC .................................... *G08B 29/18* (2013.01)

(58) Field of Classification Search
None
See application file for complete search history.

(56) References Cited

U.S. PATENT DOCUMENTS

| | | | |
|---|---|---|---|
| 5,153,835 A | 10/1992 | Hashimoto et al. | |
| 6,891,346 B2 | 5/2005 | Simmons et al. | |
| 7,714,571 B2 | 5/2010 | Pirozzi et al. | |
| RE45,388 E | 2/2015 | Wichowski et al. | |
| 9,030,139 B2 | 5/2015 | Gu | |
| 2005/0073273 A1* | 4/2005 | Maslov | H02P 6/12 318/437 |
| 2012/0235610 A1 | 9/2012 | Hisano et al. | |
| 2015/0137718 A1 | 5/2015 | Liu et al. | |

FOREIGN PATENT DOCUMENTS

WO    WO-2015054432 A1    4/2015

* cited by examiner

*Primary Examiner* — Leon Flores
(74) *Attorney, Agent, or Firm* — Locke Lord LLP; Joshua L. Jones; Daniel J. Fiorello

(57) ABSTRACT

A system for detecting sensor failure and/or operating with a failed sensor in an electrical machine includes an electrical machine, three or more sensors configured to connect to the electrical machine, and a sensor module operatively connected to each sensor to receive sensor signals from the sensors. The sensor module includes a failure detection module operatively connected to each sensor and configured to determine if each sensor is a failed sensor or a functioning sensor. The sensor module also includes a virtual sensor module operatively connected to the failure detection module and configured to output simulated sensor signals for the failed sensor, wherein the sensor module is configured to output the sensor signals for each functioning sensor. The system includes a control module operatively connected to the sensor module and the electrical machine to receive sensor signals and simulated sensor signals to control operation of the electrical machine.

16 Claims, 2 Drawing Sheets

SENSOR AND CONTROL SYSTEMS FOR ELECTRICAL MACHINES

BACKGROUND

1. Field

The present disclosure relates to electrical machines (e.g., electrical motors and generators), more specifically to sensor and control systems for electrical machines.

2. Description of Related Art

Certain electrical machine controllers (e.g., space based DC brushless motor controllers) can utilize Hall Effect (HED) sensors to provide position information of the rotor of the electrical machine. In motor applications, the position can be used to properly commutate the motor as well as provide the period of rotation which can be used to determine the speed of the motor. The speed information can be used to provide feedback for a digital closed loop speed control.

Traditionally, an electrical machine can have three HED sensors placed 120 degrees apart from each other. The loss of one of the HED sensors causes off-nominal operation that cannot always be detected by system level sensors. In such a case, a controller cannot detect or account for a HED sensor failure. For example, excessive current draw and noisy operation are among the operational failure conditions as well as complete failure to operate.

Such conventional methods and systems have generally been considered satisfactory for their intended purpose. However, there is still a need in the art for improved sensor and control systems for electrical machines. The present disclosure provides a solution for this need.

SUMMARY

A system for detecting sensor failure and/or operating with a failed sensor in an electrical machine includes an electrical machine, three or more sensors configured to connect to the electrical machine, and a sensor module operatively connected to each sensor to receive sensor signals from the sensors. The sensor module includes a failure detection module operatively connected to each sensor and configured to determine if each sensor is a failed sensor or a functioning sensor.

The sensor module also includes a virtual sensor module operatively connected to the failure detection module and configured to output simulated sensor signals for the failed sensor, wherein the sensor module is configured to output the sensor signals for each functioning sensor. The system includes a control module operatively connected to the sensor module and the electrical machine to receive sensor signals and simulated sensor signals to control operation of the electrical machine.

The sensors can be Hall-Effect (HED) sensors or any other suitable electrical machine sensor. The failure detection module can compare the sensor signals from each sensor to determine which, if any, sensor has failed. The failure detection module can determine if two or more of the sensors have sensor outputs within a predetermined range of each other, and any sensor that is outside of the predetermined range of the two or more sensors can be determined to be a failed sensor.

The virtual sensor module can output simulated sensor signals based on signals from the functioning sensors. The sensor module and the control module can be implemented together on a single computerized device. In certain embodiments, the sensor module is implemented on a plurality of computerized devices.

The module can be implemented as any suitable software stored on any suitable non-transitory computer readable medium. In some embodiments, the module can be implemented via one or more analog/digital circuits. Any combination of software, hardware description language, or hardware is contemplated herein.

A method includes receiving a sensor signal from three or more Hall-effect sensors in an electrical machine, determining if a sensor is a failed sensor, simulating output for the failed sensor based on the sensor signals from at least one remaining sensor, and outputting the simulated output to a control module to control inputs to the electrical machine.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
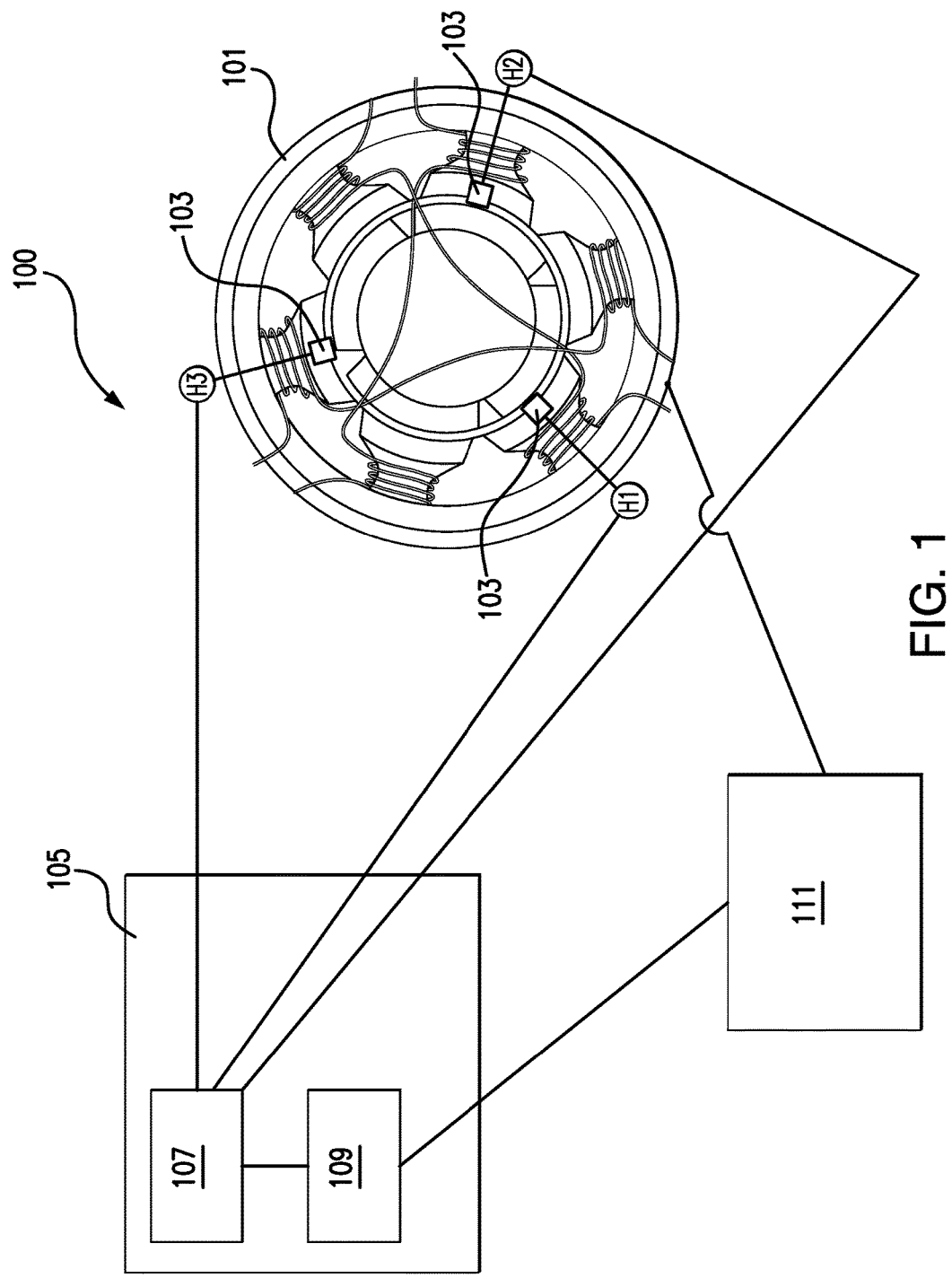
FIG. 1 is a schematic view of an embodiment of a system in accordance with this disclosure.
Figure 2:
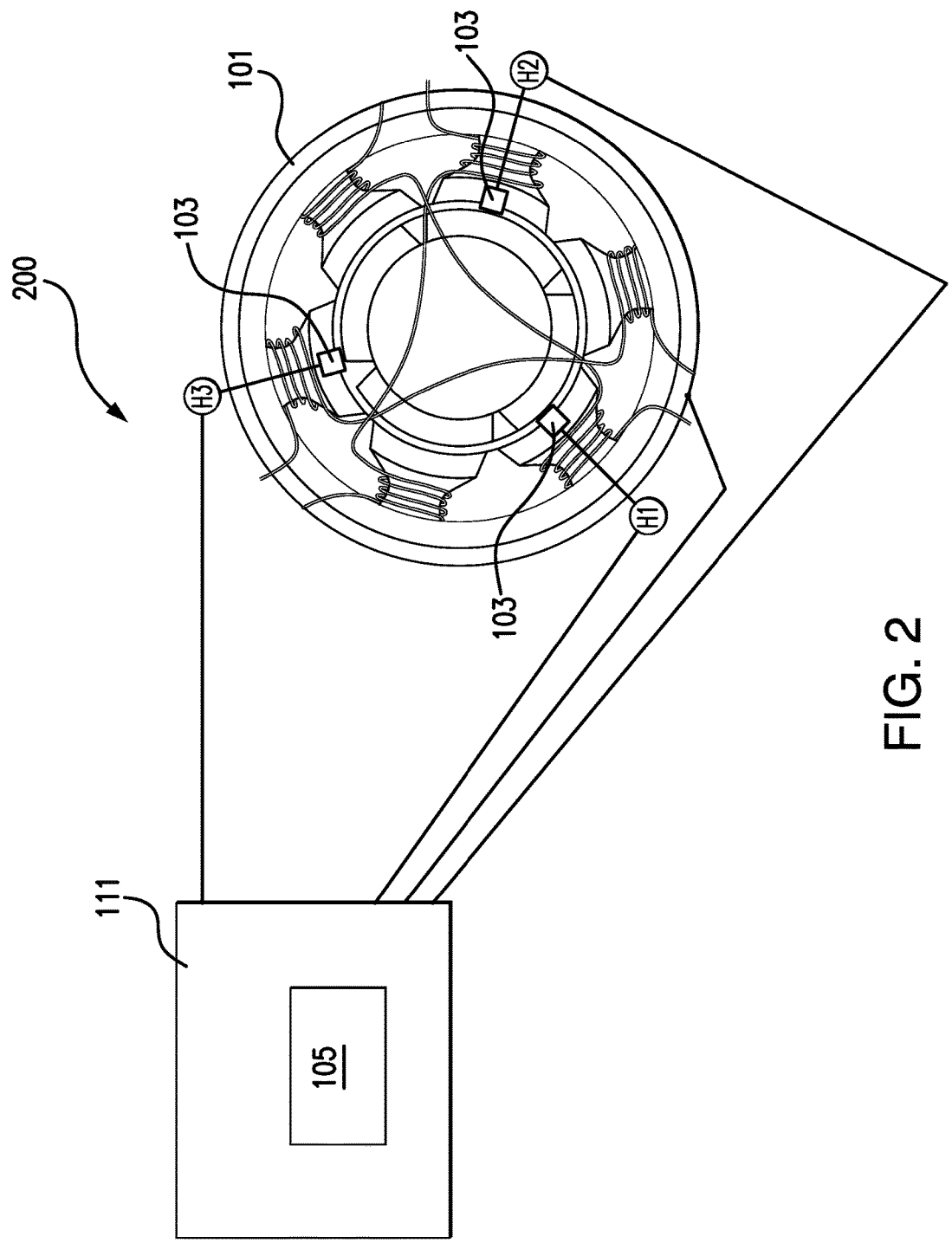
FIG. 2 is a schematic view of an embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other aspects and/or embodiments of this disclosure are shown in FIG. 2. The systems and methods described herein can be used to detect a sensor failure and/or operate an electric motor with a failed sensor.

Referring to FIG. 1, a system 100 for detecting sensor failure and/or operating with a failed sensor in an electrical machine includes an electrical machine 101 and three or more sensors 103 configured to connect to the electrical machine 100 (e.g., embedded therein as shown). The sensors can be Hall-Effect (HED) sensors or any other suitable electrical machine sensor. Any suitable number and position of sensors 103 are contemplated herein (e.g., three positioned 120 degrees apart from each other).

The system 100 also includes sensor module 105 operatively connected to each sensor 103 to receive sensor signals from the sensors 103. The sensor module 105 includes a failure detection module 107 operatively connected to each sensor 103. The failure detection module 107 is configured to determine if each sensor 103 is a failed sensor or a functioning sensor. For example, if the failure detection module 107 can compare the sensor signals from each sensor 103 to determine which, if any, sensor has failed.

In certain embodiments, the failure detection module 107 can determine if two or more of the sensors 103 have sensor outputs within a predetermined range of each other. In such a case, any sensor 103 that has outputs that are outside of the predetermined range of the two or more referenced sensors 103 can be determined to be a failed sensor. For example, as shown, the failure detection module 107 can receive sensor signals from each of the three sensors 103 and can compare all three to see if at least two of the sensors 103 have similar outputs. In certain embodiments, the failure detection module 107 can compare the present composite motor speed with speeds generated from each sensor 103. If only two have similar outputs within a predetermined range, the failure detection module 107 can determine that the third sensor 103 is a failed sensor because it does not have similar output to the other two sensors 103.

The sensor module 105 also includes a virtual sensor module 109 operatively connected to the failure detection module 107. The virtual sensor module 109 is configured to output simulated sensor signals for a sensor 103 that is determined to be a failed sensor. The sensor module 105 (e.g., the virtual sensor module 109) is configured to output the sensor signals for each functioning sensor without simulation. The virtual sensor module 109 can output simulated sensor signals based on signals from the other functioning sensors. For example, the simulated sensor signals can be an average of the functioning sensors, according to a predetermined formula for proper commutation of the electrical machine, based on position information of the rotor of the electric machine).

The system 100 includes a control module 111 operatively connected to the sensor module 105 to receive sensor signals and/or simulated sensor signals from the sensor module 105. The control module 111 can be operatively connected to the electrical machine 101 to control operation of the electrical machine 101 (e.g., via one or more current/voltage controls).

While FIG. 1 shows each sensor 103 directly connected to the failure detection module 107, it is contemplated herein that the failure detection module 107 can be connected to the sensors 103 indirectly (e.g., through control module 111). For example, referring to FIG. 2, system 200 includes a sensor module 105 as described above within the control module 111 such that the sensor module 111 can receive data and/or sensor signals from the controller 111 to determine if there is a failed sensor.

The sensor module 105 and the control module 111 as described herein can be implemented in any suitable manner, e.g., any suitable hardware (e.g., circuitry, field programmable gate arrays, microprocessors, the like), hardware description language (e.g, VHDL), and/or software (e.g., a suitable computer language as is appreciated by those skilled in the art). In certain embodiments, the sensor module 105 and the control module 111 can be implemented together on a single computerized device (e.g., with a memory, microprocessor, or any other suitable components) as shown in FIG. 2. In certain embodiments, however, the sensor module 105 can be implemented on a plurality of computerized devices (e.g., such that failure detection module 107 and virtual sensor module 109 exist on different components).

As described above, the modules 105, 111 can be implemented as any suitable software (e.g., a list of instructions of in any suitable computing language) stored on any suitable non-transitory computer readable medium (e.g., a memory). However, in some embodiments, the modules 107, 111 can be implemented via one or more analog/digital circuits. For example, one or more of the modules 105, 111 and/or components thereof can be a VHDL (Very High Speed Integrated Circuit Hardware Description Language) component implemented in a FPGA (Field Programmable Gate Array). Any suitable combination of software and hardware is contemplated herein.

In accordance with at least one aspect of this disclosure, a method includes receiving a sensor signal from three or more Hall-effect sensors (e.g., sensors 103) in an electrical machine 101, determining if a sensor 103 is a failed sensor, simulating output for the failed sensor based on the sensor signals from at least one remaining sensor, and outputting the simulated output to a control module 111 to control inputs to the electrical machine 101. The method can be implemented via any suitable hardware and/or software (e.g., as a list of computer executable instructions).

As described above, the sensor module 105 can use sensor signals and/or data from the control module 111 to determine when an individual sensor 103 has failed and create a simulated sensor signal to continue nominal operation of the controller 111. Without this, the incorrect signals from the failed sensor can cause the control module 111 to output incorrect commands to the electrical machine 101. When a variance of a sensor 103 outside a selected limit is detected, the sensor 103 is identified as failed. A virtual sensor can then be generated from the remaining two sensors 103 and used to properly commutate and control the motor. This allows for improved reliability of motor operation (e.g., for critical aerospace uses).

The methods and systems of the present disclosure, as described above and shown in the drawings, provide for electrical machine systems with superior properties including sensor failure detection and accountability. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A system for detecting sensor failure and/or operating with a failed sensor in an electrical machine, comprising:
   an electrical machine;
   three or more sensors configured to connect to the electrical machine;
   a sensor module operatively connected to each sensor to receive sensor signals from the sensors, the sensor module including:
      a failure detection module operatively connected to each sensor and configured to determine if each sensor is a failed sensor or a functioning sensor; and
      a virtual sensor module operatively connected to the failure detection module and configured to output simulated sensor signals for the failed sensor, wherein the sensor module is configured to output the sensor signals for each functioning sensor; and
   a control module operatively connected to the sensor module and the electrical machine to receive sensor signals and simulated sensor signals to control operation of the electrical machine.

2. The system of claim 1, wherein the sensors are Hall-Effect (HED) sensors.

3. The system of claim 1, wherein the failure detection module compares the sensor signals from each sensor to determine which, if any, sensor has failed.

4. The system of claim 3, wherein the failure detection module determines if two or more of the sensors have sensor outputs within a predetermined range of each other, and any sensor that is outside of the predetermined range of the two or more sensors is determined to be a failed sensor.

5. The system of claim 1, wherein the virtual sensor module outputs simulated sensor signals based on signals from the functioning sensors.

6. The system of claim 1, wherein the sensor module and the control module are implemented together on a single computerized device.

7. The system of claim 1, wherein the sensor module is implemented on a plurality of computerized devices.

8. A sensor module configured to receive sensor signals from a plurality of electrical machine sensors, comprising:
 a failure detection module operatively connected to each sensor and configured to determine if each sensor is a failed sensor or a functioning sensor; and
 a virtual sensor module operatively connected to the failure detection module and configured to output simulated sensor signals for the failed sensor, wherein the sensor module is configured to output the sensor signals for each functioning sensor.

9. The module of claim 8, wherein the sensors are Hall-Effect (HED) sensors.

10. The module of claim 8, wherein the failure detection module compares the sensor signals from each sensor to determine which, if any, sensor has failed.

11. The module of claim 10, wherein the failure detection module determines if two or more of the sensors have sensor outputs within a predetermined range of each other, and any sensor that is outside of the predetermined range of the two or more sensors is determined to be a failed sensor.

12. The module of claim 8, wherein the virtual sensor module outputs simulated sensor signals based on signals from the functioning sensors.

13. The module of claim 8, wherein the module can be implemented on a single computerized device.

14. The module of claim 8, wherein the module is implemented as software stored on a non-transitory computer readable medium.

15. The module of claim 8, wherein the module is implemented via one or more analog/digital circuits.

16. A method, comprising:
 receiving a sensor signal from three or more Hall-effect sensors in an electrical machine;
 determining if a sensor is a failed sensor;
 simulating output for the failed sensor based on the sensor signals from at least one remaining sensor; and
 outputting the simulated output to a control module to control inputs to the electrical machine.

* * * * *